(No Model.)

T. D. DUNDAS & G. SENIOR.
POWER TRANSMITTING CHAIN.

No. 601,748. Patented Apr. 5, 1898.

Witnesses

Inventors
Thomas Duncan Dundas
George Senior

UNITED STATES PATENT OFFICE.

THOMAS DUNCAN DUNDAS AND GEORGE SENIOR, OF LONDON, ENGLAND; SAID SENIOR ASSIGNOR TO SAID DUNDAS.

POWER-TRANSMITTING CHAIN.

SPECIFICATION forming part of Letters Patent No. 601,748, dated April 5, 1898.

Application filed March 20, 1897. Serial No. 628,513. (No model.) Patented in England December 17, 1896, No. 28,976.

*To all whom it may concern:*

Be it known that we, THOMAS DUNCAN DUNDAS, of 13 Killieser avenue, Streatham Hill, and GEORGE SENIOR, of 30 Caithness Road, Brook Green, Hammersmith, London, England, subjects of the Queen of Great Britain and Ireland, have invented certain new and useful Improvements in Power-Transmitting Chains, (for which we have obtained a patent in Great Britain, No. 28,976, bearing date December 17, 1896,) of which the following is a specification.

This invention relates to improvements in the construction of power-transmitting or gear chains for use on motor-cars, cycles, or in any manner in which chain-gear may be suitably employed.

Gear-chains made in accordance with this invention are so constructed as to prevent dirt or mud getting into or between the links, thus rendering the use of a gear-case unnecessary, while saving a great deal of trouble in the cleaning of the chain after riding on a muddy road, and at the same time effecting a considerable saving in the wear and tear of the chain and gear.

The better to explain this invention reference is made to the accompanying drawings.

Figure 1:
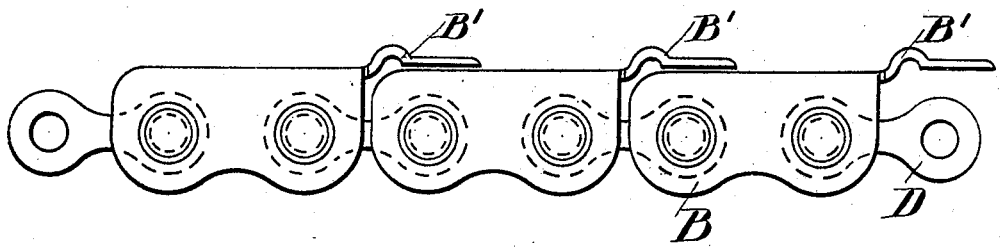
Figure 5:
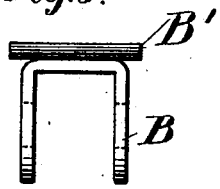
Figure 2:
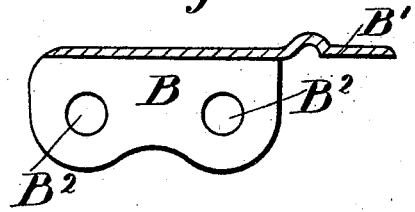
Figure 4:
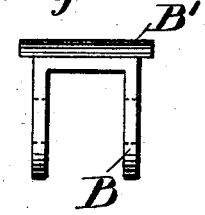
Figure 3:
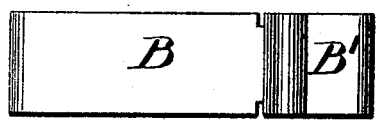

Figure 1 represents a short length of the improved chain with the links B connected in the ordinary way by rivets or other suitable means to the blocks D. Figs. 2, 3, 4, and 5 show, respectively, a section, a top plan, with front and back views of the link.

From these illustrations it will be seen that such link is made of a piece of channel-shaped metal with lip B'. This lip is so made that while it overlaps it does not touch or rest on the adjoining link. Each link is provided with holes $B^2$, through which the blocks D are connected.

The link may be made in one piece, or, if found convenient, the overhanging lip may be attached by means of rivets or by any other suitable means.

In practice it will be found than the channel-shaped links, as described, form an effective cover or shield to the chain-blocks D and also protect the teeth of the gear or sprocket wheels from dirt.

Having now particularly described and ascertained the nature of our said invention and in what manner the same is to be performed, we declare that what we claim is—

A sprocket-chain comprising a series of links, blocks pivotally connecting the links together and lips extending from each link to overhang the ends of a contiguous link, substantially as described.

In testimony whereof we have signed our names to this specification in the presence of two subscribing witnesses.

Dated this 18th day of February, 1897.

THOMAS DUNCAN DUNDAS.
    GEORGE SENIOR.

Witnesses:
    D. B. STEWART,
    G. F. MALDEN.